(12) United States Patent
Wu et al.

(10) Patent No.: US 7,609,509 B2
(45) Date of Patent: Oct. 27, 2009

(54) DATA STORAGE DEVICE CARRIER ASSEMBLY

(75) Inventors: Chia-Kang Wu, Taipei Hsien (TW); Li-Ping Chen, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 183 days.

(21) Appl. No.: 11/757,404

(22) Filed: Jun. 4, 2007

(65) Prior Publication Data

US 2008/0137282 A1 Jun. 12, 2008

(30) Foreign Application Priority Data

Dec. 8, 2006 (CN) .................... 2006 2 0016244 U

(51) Int. Cl.
*G06F 1/16* (2006.01)
(52) U.S. Cl. .................................. 361/679.33; 361/725
(58) Field of Classification Search ............ 361/679.33, 361/679.37, 679.39, 724, 727, 685; 312/223.1, 312/223.2
See application file for complete search history.

(56) References Cited

U.S. PATENT DOCUMENTS

| | | | |
|---|---|---|---|
| 5,768,099 A * | 6/1998 | Radloff et al. .............. 361/685 |
| 6,227,631 B1 | 5/2001 | Lin et al. | |
| 6,238,026 B1 * | 5/2001 | Adams et al. ............. 312/223.2 |
| 6,529,373 B1 * | 3/2003 | Liao et al. .................... 361/685 |
| 6,644,762 B1 * | 11/2003 | Chen ....................... 312/223.2 |
| 6,648,429 B2 | 11/2003 | Chen et al. | |
| 6,667,880 B2 * | 12/2003 | Liu et al. ..................... 361/685 |
| 6,781,827 B2 * | 8/2004 | Goodman et al. ........... 361/685 |
| 7,277,279 B2 * | 10/2007 | Chen et al. .................. 361/685 |
| 2003/0038566 A1 * | 2/2003 | Qiu ......................... 312/223.2 |
| 2003/0128524 A1 * | 7/2003 | Chen .......................... 361/725 |
| 2003/0169565 A1 * | 9/2003 | Wang ......................... 361/685 |
| 2006/0221566 A1 * | 10/2006 | Prasad ........................ 361/683 |
| 2006/0245158 A1 * | 11/2006 | Chen et al. .................. 361/685 |

* cited by examiner

*Primary Examiner*—Jayprakash N Gandhi
*Assistant Examiner*—Anthony Q Edwards
(74) *Attorney, Agent, or Firm*—Frank R. Niranjan

(57) ABSTRACT

A data storage device carrier assembly includes a first carrier, a second carrier, and a bracket. The first carrier includes a pair of parallel side walls configured for mounting large data storage devices therebetween. The second carrier includes a pair of parallel side plates configured for mounting small data storage devices therebetween. A distance between the pair of side plates of the second carrier is less than a distance between the pair of side walls of the first carrier. The bracket is attached on one of the side plates of the second carrier to cooperatively form a unit having a width approximately same as the distance between the pair of side walls of the first carrier. The unit is mountable between the side walls of the first carrier.

14 Claims, 5 Drawing Sheets

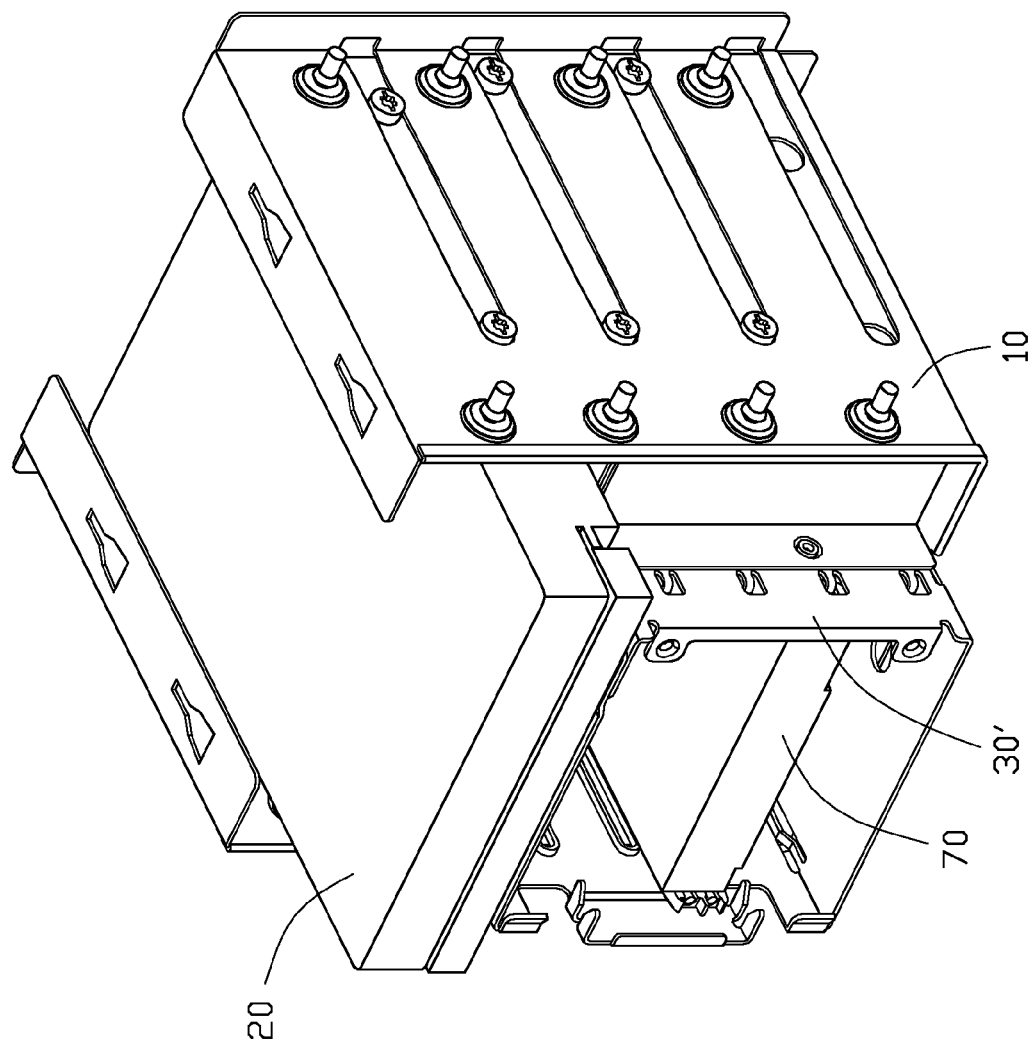

DATA STORAGE DEVICE CARRIER ASSEMBLY

BACKGROUND OF THE INVENTION

1. Field of the Invention

The present invention relates to a data storage device carrier assembly, and more particularly to a data storage device carrier assembly for accommodating data storage devices of different sizes therein.

2. Description of Related Art

Data storage devices, such as floppy disk drives or hard disk drives, are usually installed in a computer enclosure. The data storage device carriers are required to securely hold the storage devices and ensure that they run smoothly. The carriers with the data storage devices should take up as little room as possible to facilitate making the entire computer compact. Various kinds of carriers have been developed to meet these requirements.

A common arrangement is to have a large carrier for large data storage devices, and a small drive bracket for small data storage devices. Both of the large and small carriers are mounted in the enclosure to occupy different spaces. However, the carriers are usually not fully utilized because typically not all sizes of data storage devices are used simultaneously in a computer system. So the space in the enclosure is wasted.

SUMMARY OF THE INVENTION

A data storage device carrier assembly includes a first carrier, a second carrier, and a bracket. The first carrier includes a pair of parallel side walls configured for mounting large data storage devices therebetween. The second carrier includes a pair of parallel side plates configured for mounting small data storage devices therebetween. A distance between the pair of side plates of the second carrier is less than a distance between the pair of side walls of the first carrier. The bracket is attached on one of the side plates of the second carrier to cooperatively form a unit having a width approximately same as the distance between the pair of side walls of the first carrier. The unit is mountable between the side walls of the first carrier.

Other advantages and novel features of the present invention will become more apparent from the following detailed description of preferred embodiment when taken in conjunction with the accompanying drawings, in which:

BRIEF DESCRIPTION OF THE DRAWINGS

FIG. 5 is an isometric view of a data storage device carrier assembly in accordance with a second preferred embodiment.

DETAILED DESCRIPTION OF THE INVENTION

Figure 1:
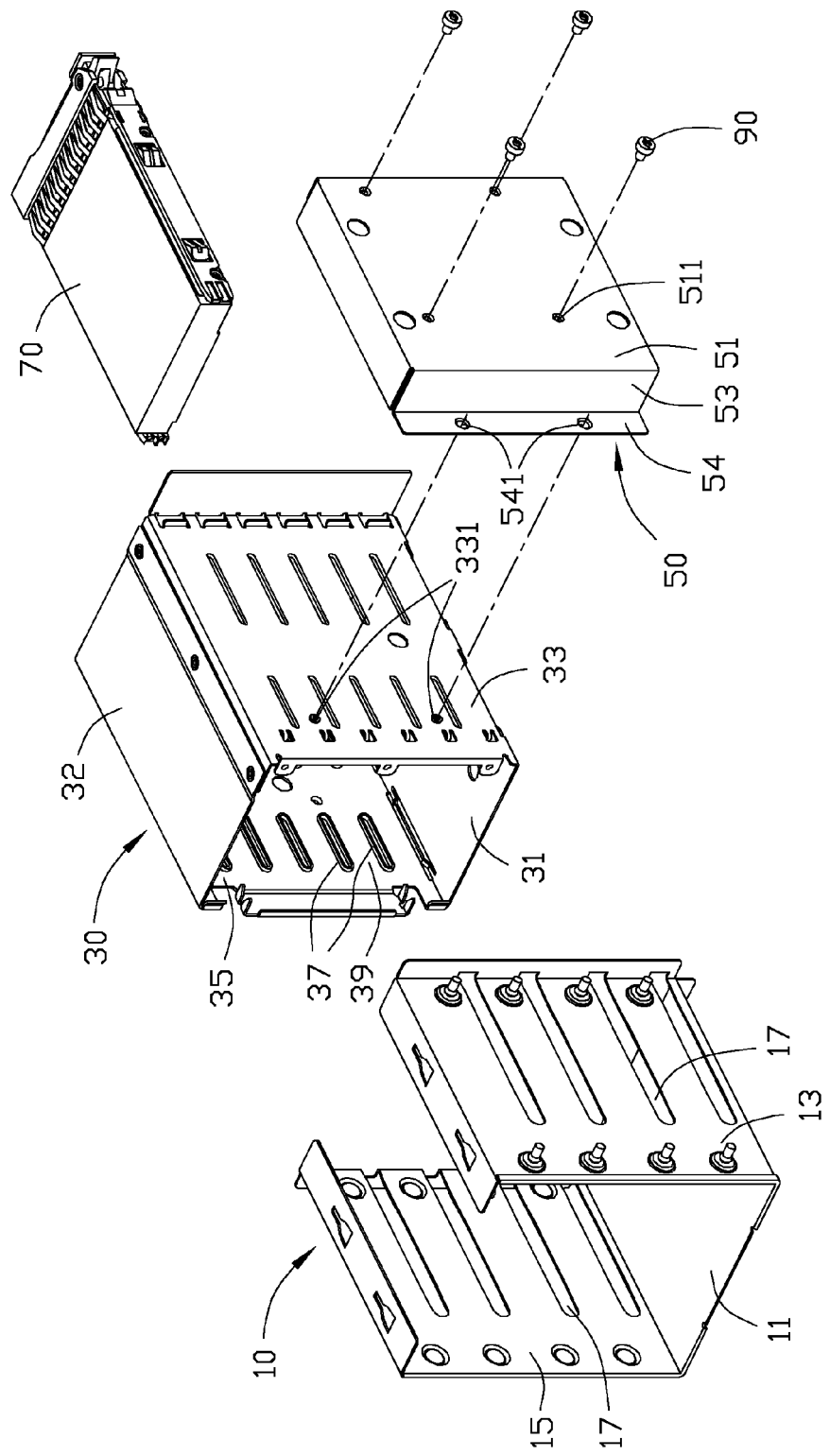
FIG. 1 is an exploded, isometric view of a preferred embodiment of a data storage device carrier assembly, which includes a first carrier, a second carrier, and a bracket.
Figure 2:
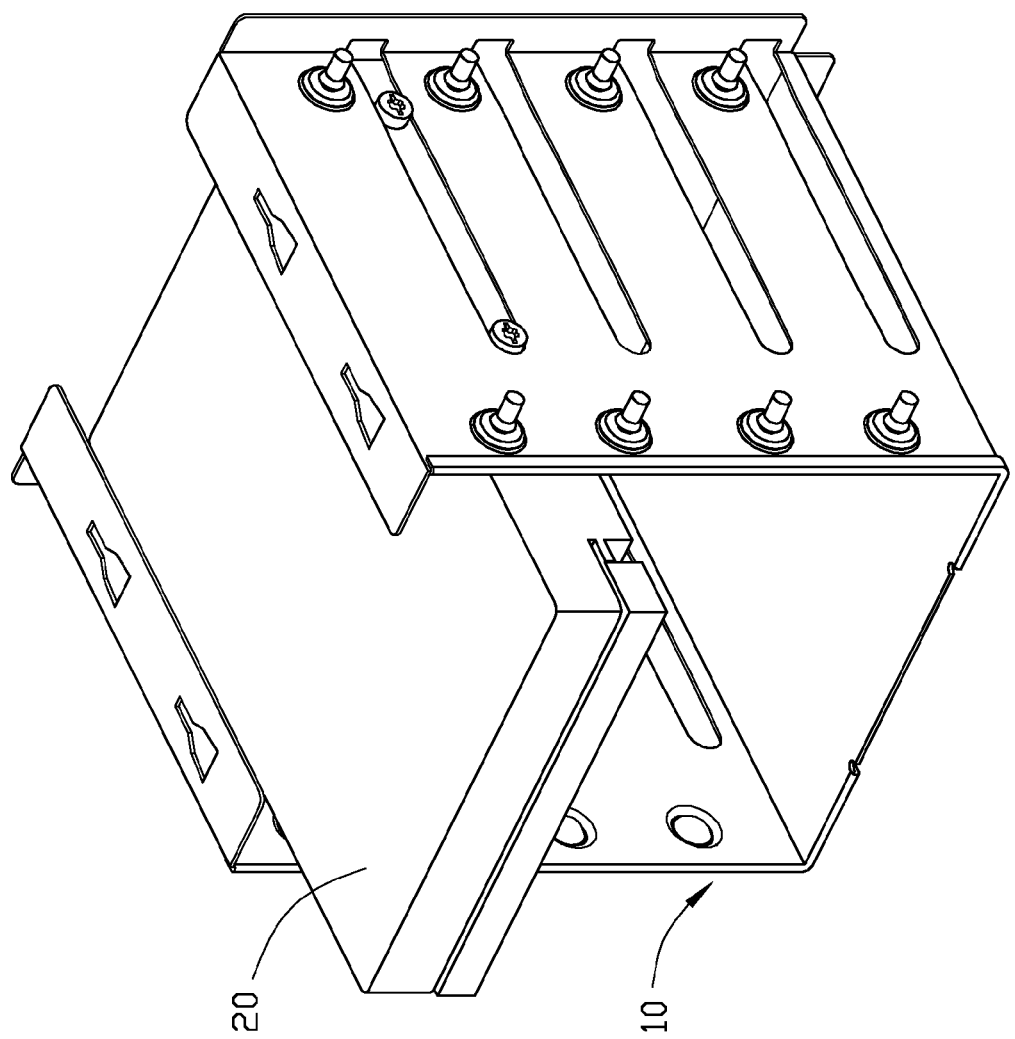
FIG. 2 is an isometric view of the first carrier of FIG. 1 accommodating a large data storage device.
Figure 3:
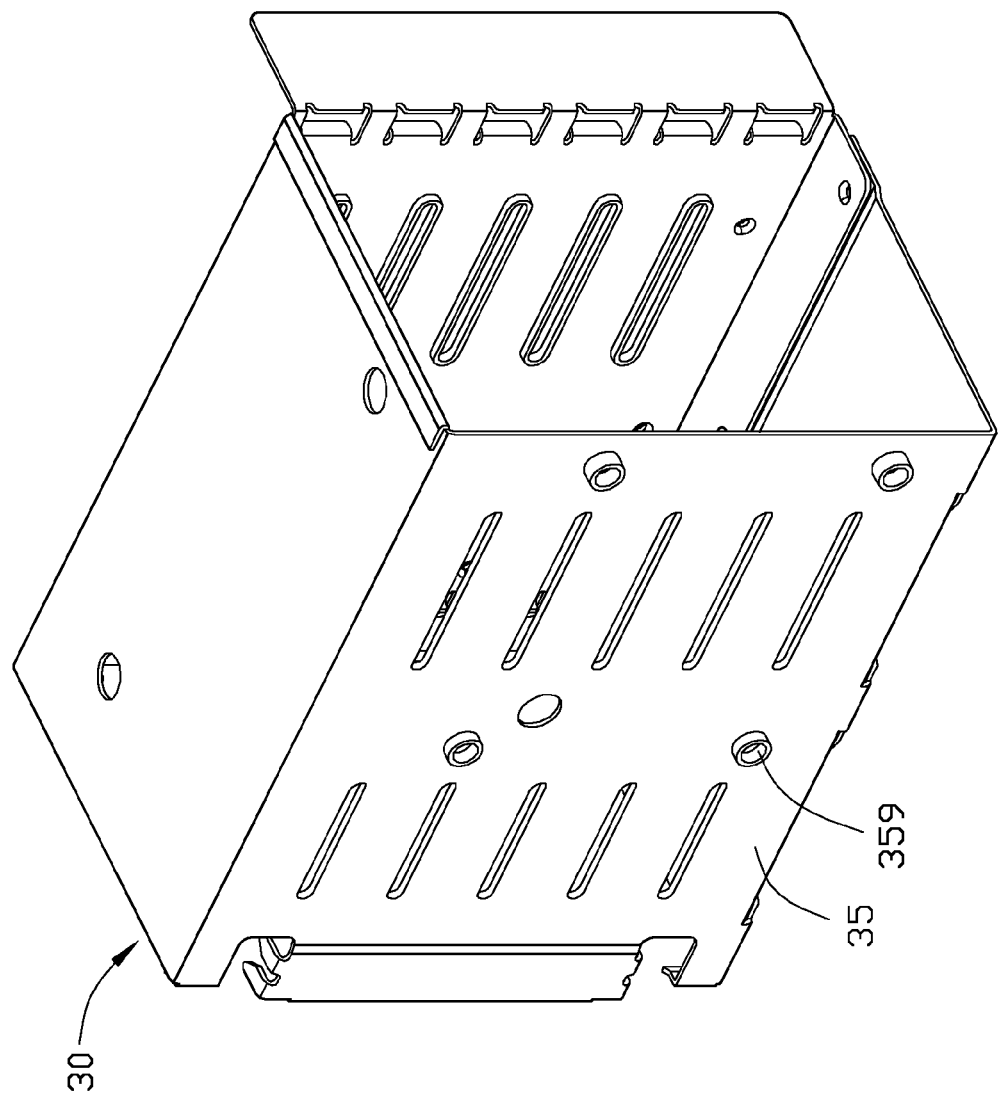
FIG. 3 is an isometric view of the second carrier of FIG. 1.
Figure 4:
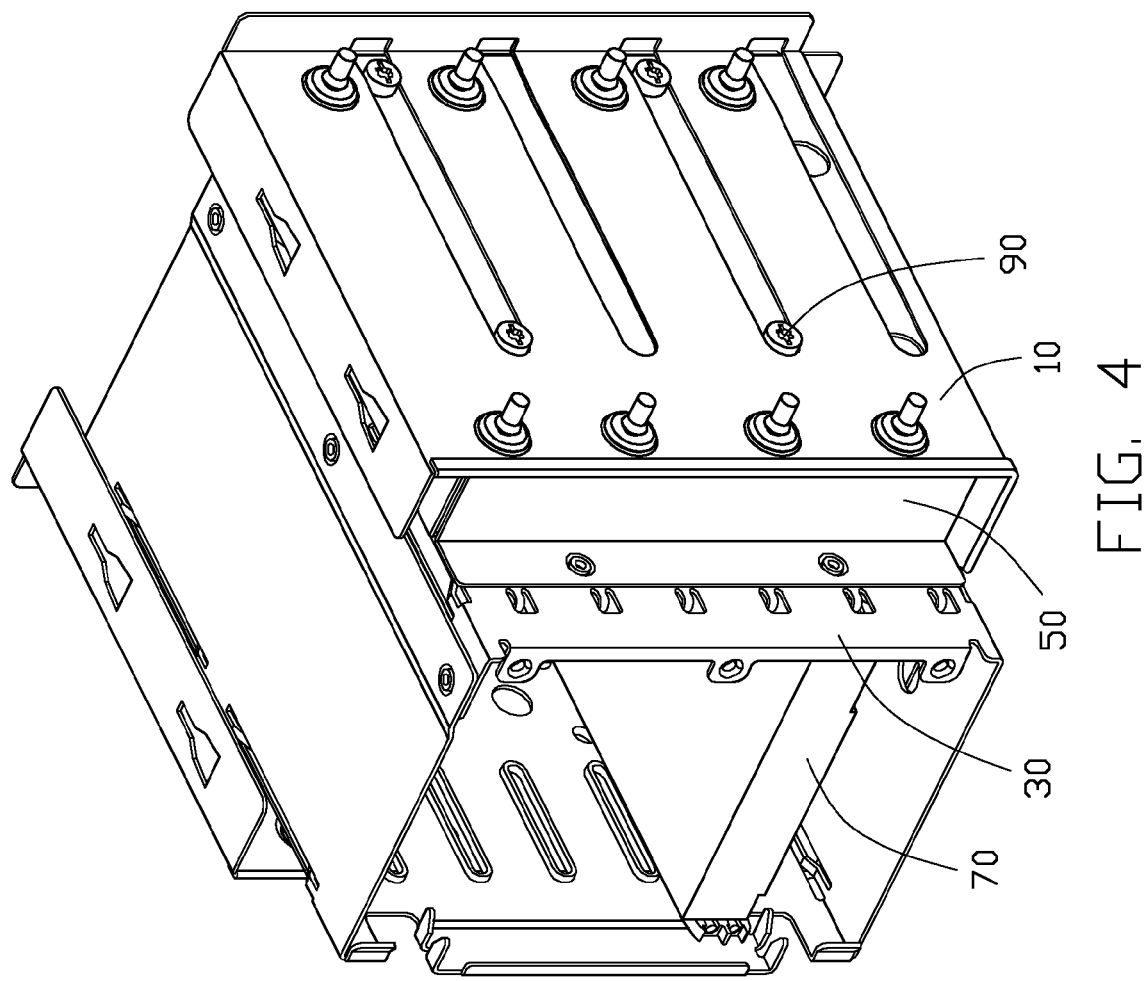
FIG. 4 is an assembled view of the data storage device carrier assembly of FIG. 1.

Referring to FIGS. 1, 2, and 3, a data storage device carrier assembly in accordance with a preferred embodiment of the present invention includes a first carrier 10, a second carrier 30, and a bracket 50.

The first carrier 10 includes a bottom wall 11 and a pair of parallel side walls 13, 15 extending upwardly and perpendicularly from opposite edges of the bottom wall 11. The bottom wall 11 and the side walls 13, 15 together define a large receiving space adapted to accommodate a plurality of large data storage devices 20 therein (shown in FIG. 2). A plurality of horizontal sliding grooves 17 is defined in the side walls 13, 15. Each of the sliding grooves 17 of the side wall 13 is level with a corresponding sliding groove 17 of the side wall 15 to form a pair of sliding grooves corresponding to one large data storage device 20.

The second carrier 30 is smaller than the first carrier 10, and can be accommodated in the first carrier 10. The second carrier 30 includes a bottom plate 31, a top plate 32, and a pair of parallel side plates 33, 35. The bottom plate 31, the top plate 32 and the side plates 33, 35 together define a small receiving space adapted to accommodate a plurality of small data storage devices 70. Inner surfaces of the side plates 33, 35 form a plurality of horizontal supporting flanges 37 extending in toward each other. Each two adjacent supporting flanges 37 defines a guideway 39 therebetween. Each of the guideways 39 of the side plates 33 is level with a corresponding guideway 39 of the side plate 35 to form a pair of guideways 39 adapted for a small data storage device 70 sliding into. A pair of securing posts 331 is formed on an outer surface of the side plate 33. A plurality of protrusions 359 is protruded from an outer surface of the side plate 35 (shown in FIG. 3).

The bracket 50 is designed to be mounted on an outer surface of the side plate 33 of the second carrier 30 to form a unit having approximately a same width as the large data storage device 20. The bracket 50 includes a side piece 51 parallel to the side wall 13 of the first carrier 10, and four sidewalls 53 extending from four edges of the side piece 51 toward the side plate 33 of the second carrier 30. A width of each sidewall 53 is equal to or a little less than a difference between the distance of the inner surfaces of the side walls 13,15 of the first carrier 10 and the outer surfaces of the side plates 33, 35 of the second carrier 30. A flange 54 is bent from one of the sidewalls 53 to be parallel with the side plate 33. The flange 54 defines a pair of holes 541 therein corresponding to the securing posts 331 of the side plate 33. The side piece 51 defines a plurality of securing holes 511 therein adapted for securing a plurality of sliding members 90. In the present embodiment, the sliding members 90 are screws.

Referring to FIGS. 1 to 4, in assembly, the small data storage device 70 slides into the second carrier 30 with lateral edges of the small data storage device 70 located on the supporting flanges 37 of the second carrier 30. The sliding members 90 are secured in the securing holes 511 of the bracket 50. The bracket 50 is moved to the side plate 33 of the second carrier 30 with the securing posts 331 of the second carrier 30 interferentially inserted into the holes 541 of the bracket 50 to secure the bracket 50 on the outer face of the side plate 33.

The second carrier 30 together with the small data storage device 70 and the bracket 50 is then accommodated in the first carrier 10. The protrusions 359 on the side plate 35 of the second carrier 30 slide into the sliding grooves 17 in the side wall 15 of the first carrier 10, and the sliding members 90 slide into the sliding grooves 17 in the side wall 13 of the first carrier 10. So, the small data storage device 70 is mounted in the first carrier 10 within the unit formed by the second carrier 30 and the bracket 50.

In a computer enclosure, the first carrier 10 is firstly mounted to accommodate large data storage devices 20. If the small data storage device 70 is needed in the computer system, the second carrier 30 and bracket 50 are used to mount the small data storage device 70 in the first carrier 10.

Referring to FIG. 5, in the second embodiment, another second carrier 30' is designed smaller than the second carrier 30 in the previous embodiment. Then, after the second carrier 30' is mounted into the first carrier 10, the first carrier 10 still has surplus space to also accommodate the large data storage device 20.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A data storage device carrier assembly, comprising:
   a first carrier comprising a pair of parallel side walls configured for mounting large data storage devices therebetween; and
   a second carrier comprising a pair of parallel side plates configured for mounting small data storage devices therebetween, a distance between the pair of side plates of the second carrier being less than a distance between the pair of side walls of the first carrier, a bracket attached on one of the side plates of the second carrier to cooperatively form a unit having a width approximately same as the distance between the pair of side walls of the first carrier, the unit being mountable between the side walls of the first carrier;
   wherein one of the side walls of the first carrier defines a sliding groove therein, and one of the side plates of the second carrier forms a protrusion configured to slide in the sliding groove.

2. The data storage device carrier assembly as described in claim 1, wherein one of the side walls of the first carrier defining a sliding groove therein, and the bracket forms a sliding member configured to slide in the sliding groove.

3. The data storage device carrier assembly as described in claim 2, wherein the bracket comprises a side piece parallel to the side walls of the first carrier, and the sliding member is arranged on the side piece.

4. The data storage device carrier assembly as described in claim 3, wherein the bracket forms a sidewall sandwiched between the side piece and the second carrier to widen the second carrier.

5. The data storage device carrier assembly as described in claim 4, wherein a width of the sidewall is equal to a difference between the distance of the inner surfaces of the side walls of the first carrier and the outer surfaces of the side plates of the second carrier.

6. The data storage device carrier assembly as described in claim 4, wherein the sidewall is bent to form a flange parallel to the side plates of the second carrier, the flange defines a hole therein, the one of the side plates forms a securing post corresponding to the hole, and the bracket is secured on the one of the side plates in such a manner that the securing post is interferentially inserted into the hole and the flange resists against the one of the side plates.

7. The data storage device carrier assembly as described in claim 1, wherein inner surfaces of the side plates of the second carrier respectively form a plurality of supporting flanges extending in toward each other, each two adjacent supporting flanges defines therebetween a guideway configured for the small data storage devices sliding therealong.

8. A data storage device carrier assembly for carrying data storage devices, comprising:
   a first carrier comprising a pair of parallel side walls configured for mounting large data storage devices therebetween, each of the side walls defining a sliding groove therein; and
   a second carrier configured to be mounted in the first carrier, the second carrier comprising a pair of parallel side plates configured for mounting small data storage devices therebetween, one side plate of the second carrier forming a protrusion configured to slide in the sliding groove of one side wall of the first carrier, a bracket attached on the other side plate of the second carrier, and the bracket forming a sliding member configured to slide in the sliding groove of the other side wall of the first carrier, the large data storage devices having width larger than that of the small data storage devices.

9. The data storage device carrier assembly as described in claim 8, wherein the bracket comprises a side piece parallel to the side walls of the first carrier, and the side piece forms the sliding member thereon.

10. The data storage device carrier assembly as described in claim 9, wherein the bracket forms a sidewall between the side piece of the bracket and the other side plate of the second carrier to widen the second carrier.

11. The data storage device carrier assembly as described in claim 10, wherein a width of the sidewall is equal to a difference between the distance of the inner surfaces of the side walls of the first carrier and the outer surfaces of the side plates of the second carrier.

12. The data storage device carrier assembly as described in claim 11, wherein the sidewall is bent to form a flange parallel to the side plates of the second carrier, the flange defines a hole therein, the other side plate forms a securing post corresponding to the hole, and the bracket is secured on the other side plate in such a manner that the securing post is interferentially inserted into the hole and the flange resists against the other side plate.

13. The data storage device carrier assembly as described in claim 8, wherein inner surfaces of the side plates of the second carrier respectively form a plurality of supporting flanges extending in toward each other, each two adjacent supporting flanges defines a guideway therebetween configured for the small data storage devices received therein.

14. The data storage device carrier assembly as described in claim 8, wherein the side plates of the second carrier are shorter than the side walls of the first carrier such that a surplus space is formed between the side walls configured far accommodating at least one of the large data storage devices when the second carrier is mounted in the first carrier.

* * * * *